United States Patent [19]
Stevens

[11] Patent Number: 5,875,587
[45] Date of Patent: Mar. 2, 1999

[54] ROTARY WICK WIPER APPARATUS FOR TREATING PLANTS

[76] Inventor: Alec Martin Stevens, c/- Weedbug Pty Ltd, Ground Level, 50 Leichhardt Street, Spring Hill, Brisbane, Queensland, 4000, Australia

[21] Appl. No.: 693,337
[22] PCT Filed: Feb. 14, 1995
[86] PCT No.: PCT/AU95/00065
§ 371 Date: Aug. 13, 1996
§ 102(e) Date: Aug. 13, 1996
[87] PCT Pub. No.: WO95/21524
PCT Pub. Date: Aug. 17, 1995

[30] Foreign Application Priority Data

Feb. 14, 1994 [AU] Australia .................. PM 3872

[51] Int. Cl.⁶ .................................................. A01M 21/00
[52] U.S. Cl. ................................................................ 47/1.5
[58] Field of Search ........................ 47/1.5, 1.7; 239/145

[56] References Cited

U.S. PATENT DOCUMENTS 3,212,216  10/1965  Ludwig ...................................... 47/1.5
4,464,862  8/1984   Peterson et al. ........................... 47/1.5
4,719,719  1/1988   Stevens ...................................... 47/1.5

FOREIGN PATENT DOCUMENTS 589361  9/1985  Australia .
 58612  8/1982  European Pat. Off. ................... 47/1.5

*Primary Examiner*—John A. Ricci

[57] ABSTRACT

The invention provides a rotary wick wiper apparatus (10) for plants, of the type wherein a rotor assembly (12) is operatively connected to a motor (15) whereby it may be rotated about an axis (13) disposed substantially vertically in use, the rotor assembly having a wick (17) beneath it for plant-wiping function and arranged to receive liquid from a reservoir (19) above the bottom of the rotor assembly (12) and movable with the rotor assembly; characterized in that the reservoir (19) has an air vent (28) on a portion thereof which is normally elevated and disposed inwardly relative to the rotor assembly axis of rotation, the air vent (28) being connected to one end of an air tube (29) of small diameter extending circuitously around the rotor assembly (12) and having its other end providing an air-intake opening (33) on a part of the rotor assembly disposed outwardly of the air vent (28) relative to the axis of rotation (13).

10 Claims, 3 Drawing Sheets

ROTARY WICK WIPER APPARATUS FOR TREATING PLANTS

TECHNICAL FIELD OF THE INVENTION

THIS INVENTION relates to improvements in rotary wick wiper apparatus for treating plants, and it has particular reference to known types of apparatus such as a ropewick applicator for applying herbicides and the like to annual and perennial weeds by a rotary wiping action.

BACKGROUND ART

One very, successful form of apparatus of the abovementioned general type is that sold under the registered trade mark "WEEDBUG" and the subject of Australian Patent No. 589361. Apparatus according to that invention may take various forms, including a tractor-mounted machine ideally suited to the application of weed-killing chemicals up to and around tree trunks, even in windy conditions. Typically the machine uses ropewick application from rotating discs or rotors fitted to adjustable arms so that the disc or rotor speed controls the chemical flow. Each rotor or disc has a cover assembly to roll around trees on soft bump edges, protecting the bark from abrasion while the disc works under the cover assembly. Such a machine can be operated under low hanging trees, and it may employ a single applicator rotor if desired, but usually two or more will be incorporated in each such machine which can also be used effectively along fencelines, road or pond edges, and in open areas requiring weed control.

Reference to the said Australian patent specification No. 589361 will show that the rotor has means whereby it may be rotated about an axis disposed substantially vertically in use and having a bottom disc through which the wick means extend for operation therebeneath, there being in practice a plurality of equally spaced wicks passing sealably through apertures in the disc from an annular reservoir above the disc and rotatable therewith. FIGS. 1 and 3 of the drawings of the earlier patent specification show basic requirements for the reservoir, while FIG. 4 shows an annular structure using the disc itself as a lower part of the reservoir. The arrangement for the wicks as shown in FIG. 5 of the earlier patent specification has been found very satisfactory in relation to design details, but most other components can be varied considerably within the broad ideas disclosed therein.

While the machines of the aforedescribed types, such as those sold under the registered trade mark "WEEDBUG", have been found very effective in achieving their objects, we have found that the continuous and consistent or steady application or flow of liquid through the wicks can be hampered by the fact that the reservoir is sealed to atmosphere except at the apertures through which the wicks pass to beneath the rotor disc. It will be appreciated that the withdrawal of liquid from the reservoir causes the formation of vacuum conditions which are currently relieved only by drawing back of air to the reservoir through the wicks or their mountings. The provision of a vent normally presents difficulties because liquid could be expelled centrifugally therethrough most undesirably. Also its location must not only be at an elevated position above liquid level in normal use, but it must take into account the fact that the rotors when inoperative can be swung upwards on the machine with the axis of rotation becoming or approaching horizontal and facilitating spillage through the air vent.

Our present invention has been devised to overcome or ameliorate the difficulties currently experienced as abovementioned, and it has for its principal object the provision of vent means for the reservoir whereby the desired venting will be achieved but without the disadvantageous consequences of a normal venting system as aforestated. Other objects of the invention are to provide a novel venting arrangement which can be put into effect without substantially altering existing design features of the machines. A further object is to provide such improvements which will be of simple and inexpensive form, which may be quickly and easily fitted, and which will prove reliable and durable in use. Other objects and advantages of the invention will be clear from the subsequent descriptions.

DISCLOSURE OF THE INVENTION

With the foregoing and other objects in view, our invention resides broadly in a rotary wick wiper apparatus for plants, of the type wherein a rotor assembly is operatively connected to means whereby it may be rotated about an axis disposed substantially vertically in use, the rotor assembly having wick means beneath it for plant-wiping function and arranged to receive liquid from a reservoir above the bottom of the rotor assembly and movable with the rotor assembly; characterised in that the reservoir has an air vent on a portion thereof which is normally elevated and disposed inwardly relative to the rotor assembly axis of rotation, said air vent being connected to one end of an air tube of small diameter extending circuitously around the rotor assembly and having its other end providing an air-intake opening on a part of the rotor assembly disposed outwardly of said air vent relative to said axis of rotation.

Preferably, the reservoir is of continuous annular form about the axis of rotation and forming part of said rotor assembly, the air vent being provided on a removable annular lid of the rotor assembly. It is also preferred that the lid is of disc-like annular form defined by and between concentrically circular lid edges beneath which are sealing strips for securement to upstanding rims of the inner and outer peripheries of the annular reservoir.

Suitably, the air vent in the annular lid is an aperture through the lid near to its inner periphery, said air tube being mounted on the lid and having its one end sealably connected to said aperture. Preferably in such an embodiment, the air tube extends outwardly from the air vent aperture and then through at least one turn around an outer part of the lid before terminating in said air-intake opening near to the outer edge of the lid.

In a preferred form of the invention, the air tube is turned through two full concentric coils between its end which is connected to the air vent aperture and its end which constitutes the air-intake opening. In that event, suitably the air tube at that end thereof which is connected to the air vent aperture extends radially along the top surface of the lid and then turned through a curve over approximately ninety degrees before extending through said two full concentric coils to the other end which constitutes the air-intake opening.

In all cases it is preferred that the tube is secured to the lid by releasable clip means and extends around the lid from its inner to outer ends in the direction of rotation of the rotor assembly. Other features of the invention will be hereinafter apparent.

BRIEF DESCRIPTION OF THE DRAWINGS

In order that the invention may be more readily understood and put into practical effect, reference will now be made to the accompanying drawings, wherein.

DETAILED DESCRIPTION OF THE INVENTION

Figure 1:
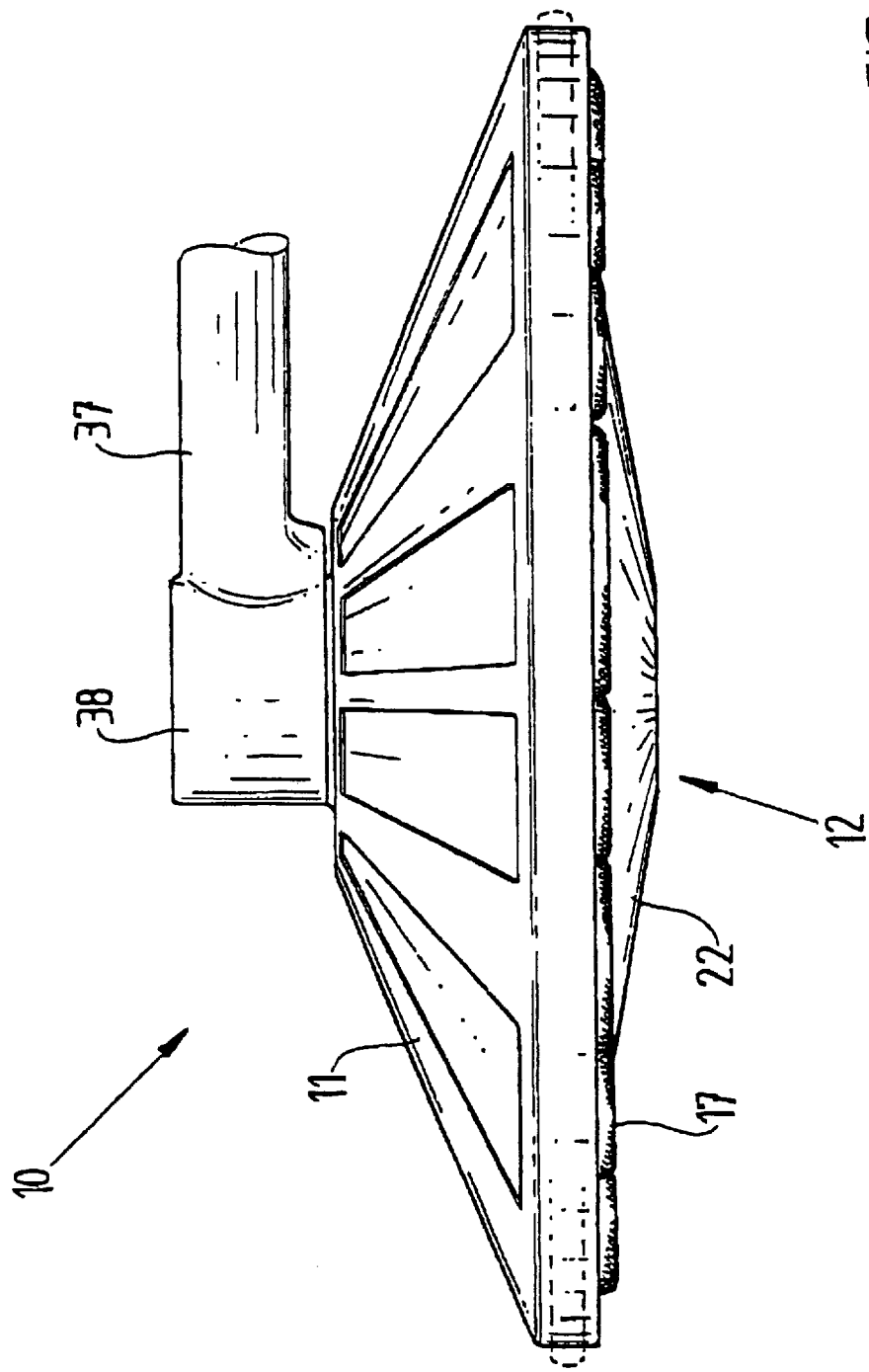
FIG. 1 shows in side elevation part of a known type of rotary wick wiper apparatus but fitted with the reservoir-venting means according to the present invention.
Figure 2:
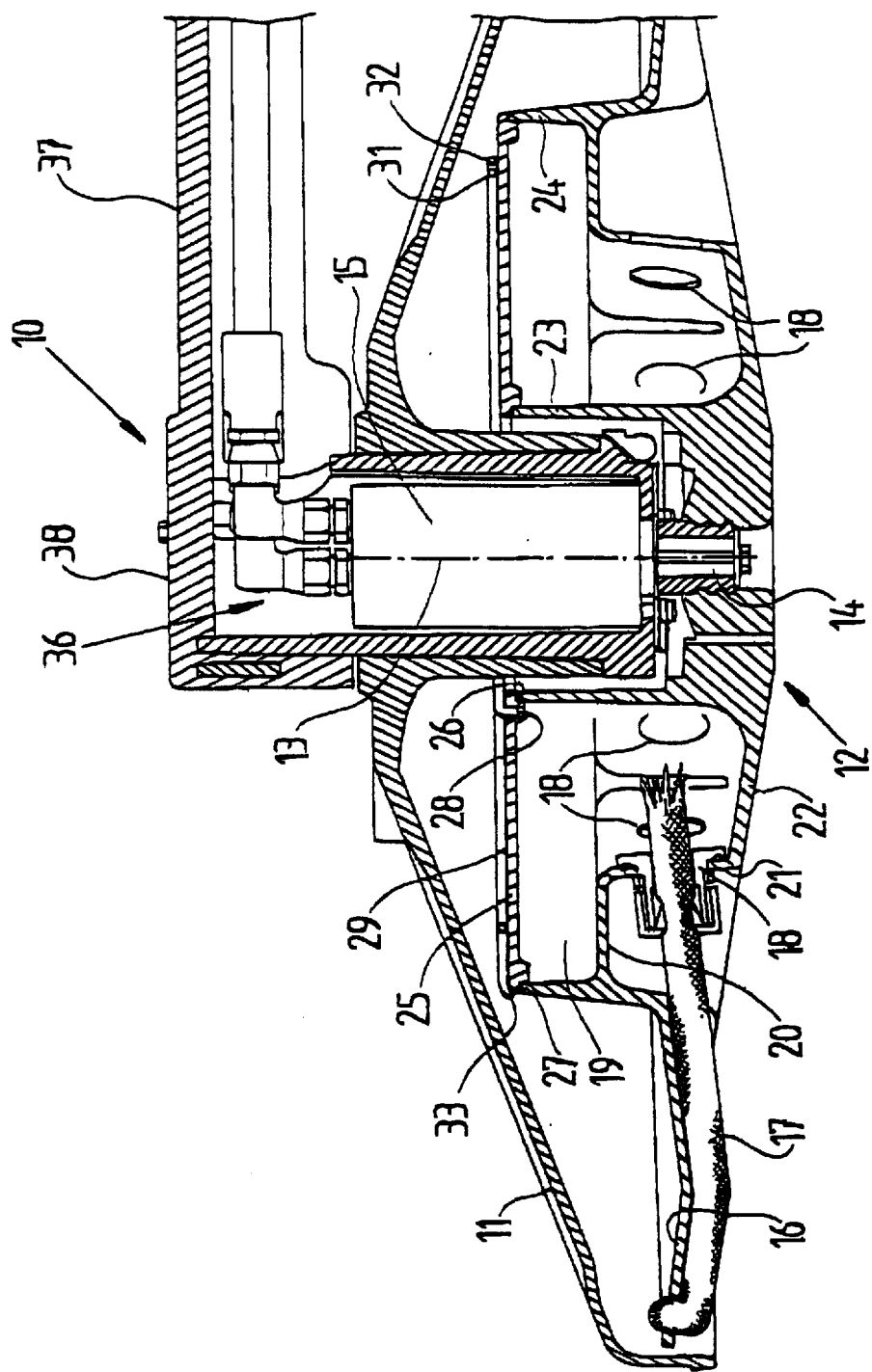
FIG. 2 is a sectional side elevation corresponding to FIG. 1.

Referring initially to FIGS. 1 and 2 of the drawings, the rotary wick wiper apparatus 10 is basically the same as in the Australian patent specification No. 589361 in that the rigid frustro-conical housing 11 has therebeneath a rotor assembly 12 which is rotatable about an axis 13 by being secured to rotatable shaft 14 of a motor 15. The latter is driven by hydraulic means 36 extending to a power source along with the mounting arm 37 leading from the central hub section 38. The rotor assembly 12 has a bottom disc 16 shaped to carry wicks therebeneath, one wick 17 being illustrated where it sealably passes through an aperture 18 into the reservoir 19.

It will be noted that the bottom disc 16 has portions 20, 21 and 22 defining bottom sections of the reservoir 19 which has inner and outer annular rims 23 and 24 forming side walls. The upper end of the reservoir 19 is closed by a lid 25 having the novel features of the present invention. The other components will be self-evident, there being shown other openings or apertures 18 for further wicks to form a pattern, along the lines of that illustrated in FIG. 5 of the said earlier patent.

Figure 3:
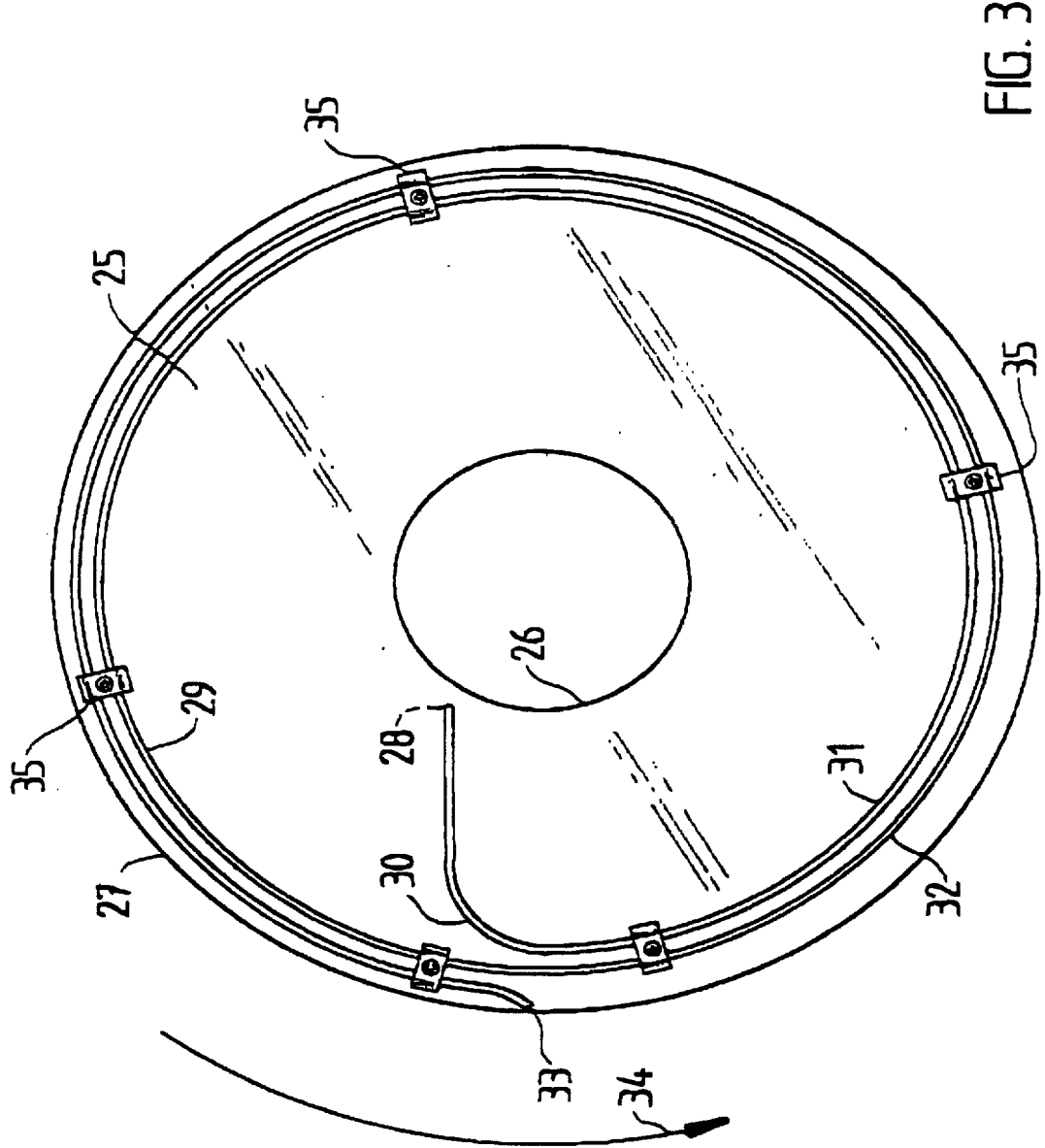
FIG. 3 shows in plan view the reservoir lid and vent arrangements of the apparatus of FIGS. 1 and 2.

Referring now to FIG. 3, the lid 25 may be plain on its underside or provided with sealing ribs for strengthening purposes and so that it can engage on and be secured by screws (not shown) to the top faces of the rims 23 and 24, such sealing ribs being concentric at the inner and outer peripheries 26 and 27 of the annular lid 25. Near to the inner periphery 26, there is an air vent aperture at 28 in which is secured the inner end of a small-diameter tube 29 which extends more or less radially outwards and then through about ninety degrees in a non-sharp bend 30 before continuing through two concentric loops 31 and 32 to a terminal opening or air intake 33. The direction of rotation of the lid 25 and rotor assembly 12 is indicated by the arrow 34, and it will be clear that there is a resultant tendency for liquid in the tube 29 to be urged back to the reservoir as rotation takes place. FIG. 3 also indicates the positions of clip means 35 spaced around the lid, such as metal clips held by middle screws, but any other form of clip would suffice.

It will be clear that the air vent aperture 28 will be uppermost and above liquid level in the reservoir 19, while its inner location prevents liquid reaching it through centrifugal force, and the result of vacuum avoidance will be achieved. If the apparatus is raised to bring the rotation axis 13 to horizontal or the like, the continuous loops 31 and 32 provide the equivalent of "air locks" to prevent liquid running out in a syphon manner as would otherwise occur, and when vertical disposition of the axis 13 is restored, full equilibrium conditions are restored. Thus, the tube 29 provides the function of a valve but without the disadvantages attendant upon mechanical contrivances which are subject to sticking or clogging. Our invention will admit air to the extent necessary according to desired design features and will be effective at all times and at all angles of operation.

In practice, the reservoir is filled through the wick aperture to a level which is required, being much less than totally filled which would be both unnecessary and inducive of problems. The length of the tube 29 should be sufficient to cater for expansion of air therein under heated conditions, and it can be made in any number of loops, two or more being preferable. The tube may by way of example be 3 mm to 4 mm in internal diameter, and it may take other shapes which are circuitous or tortuous apart from that illustrated. The non-sharp bend arrangements ensure a smooth transition of flow of any liquid which enters or is trapped therein according to prevailing conditions, as opposed to undesirable sharp angles. Rotation of the rotor assembly and reservoir lid will always be in the same direction, urging flow back to the reservoir of liquid in the tube. The diameter of the tube can be as desired but is selected so that clogging by dust or other material is resisted. The lid may suitably be made of polyurethane but any material will suffice, while its outside diameter in this instance is about 40 cms for illustrative purposes.

Various other modifications of the invention are contemplated which will be apparent to persons skilled in the art and which can be resorted to without departing from the spirit and scope of the invention as defined by the appended claims.

I claim:

1. A rotary wick wiper apparatus for plants, of the type wherein a rotor assembly is operatively connected to means whereby it may be rotated about an axis disposed substantially vertically in use, the rotor assembly having wick means beneath it for plant-wiping function and arranged to receive liquid from a reservoir above the bottom of the rotor assembly and movable with the rotor assembly; characterised in that the reservoir has an air vent on a portion thereof which is normally elevated and disposed inwardly relative to the rotor assembly axis of rotation, said air vent being connected to one end of an air tube of small diameter extending circuitously around the rotor assembly and having its other end providing an air-intake opening on a part of the rotor assembly disposed outwardly of said air vent relative to the said axis of rotation.

2. A rotary wick wiper apparatus according to claim 1, and further characterised in that the reservoir is of continuous annular form about the axis of rotation and forming part of said rotor assembly, the air vent being provided on a removable annular lid of the rotor assembly.

3. A rotary wick wiper apparatus according to claim 2, and further characterised in that the lid is of disc-like annular form defined by and between concentrically circular lid edges beneath which are sealing strips for securement to upstanding rims of the inner and outer peripheries of the annular reservoir.

4. A rotary wick wiper apparatus according to claim 3, and further characterized in that the air vent in the annular lid is an aperture through the lid near to its inner periphery, said air tube being mounted on the lid and having its one end sealably connected to said aperture.

5. A rotary wick wiper apparatus according to claim 2, and further characterised in that the air vent in the annular lid is an aperture through the lid near to its inner periphery, said air tube being mounted on the lid and having its one end sealably connected to said aperture.

6. A rotary wick wiper apparatus according to claim 5, and further characterised in that the air tube extends outwardly from the air vent aperture and then through at least one turn around at outer part of the lid before terminating in said air-intake opening near to the outer edge of the lid.

7. A rotary wick wiper apparatus according to claim 6, and further characterised in that the air tube is turned through two full concentric coils between its end which is connected to the air vent aperture and its end which constitutes the air-intake opening.

8. A rotary wick wiper apparatus according to claim 7, and further characterised in that the air tube at that end thereof which is connected to the air vent aperture extends radially along the top surface of the lid and then turned through a curve over approximately ninety degrees before extending through said two full concentric coils to the other end which constitutes the air-intake opening.

9. A rotary wick wiper apparatus according to claim 8, and further characterized in that the tube is secured to the lid by releasable clip means and extends around the lid from its inner to outer ends in the direction of rotation of the rotor assembly.

10. A rotary wick wiper apparatus according to claim 5 and further characterised in that the tube is secured to the lid by releasable clip means and extends around the lid from its inner to outer ends in the direction of rotation of the rotor assembly.

* * * * *